United States Patent [19]

Stoltz

[11] Patent Number: 5,634,229
[45] Date of Patent: Jun. 3, 1997

[54] SWIMING POOL CLEANER

[76] Inventor: Herman Stoltz, Kincoss Street, Faerie Glen, Pretoria, South Africa

[21] Appl. No.: 514,419

[22] Filed: Aug. 11, 1995

[30] Foreign Application Priority Data

Aug. 22, 1994 [ZA] South Africa ............................ 94/6363

[51] Int. Cl.$^6$ ....................................................... E04H 3/20
[52] U.S. Cl. .................. 15/1.7; 15/404; 137/521; 137/527; 137/849
[58] Field of Search ...................... 15/1.7, 404; 137/527, 137/846, 849, 521

[56] References Cited

U.S. PATENT DOCUMENTS

| 586,618 | 7/1897 | Noll | 137/527 |
|---|---|---|---|
| 2,956,582 | 10/1960 | Pranter | 137/527 |
| 4,023,227 | 5/1977 | Chauvier | 15/1.7 |
| 4,584,733 | 4/1986 | Tietge | 15/1.7 |
| 4,769,867 | 9/1988 | Stoltz . | |
| 5,033,148 | 7/1991 | Chauvier | 15/1.7 |
| 5,033,504 | 7/1991 | Kallenbach . | |
| 5,269,913 | 12/1993 | Atkins | 15/1.7 |
| 5,337,433 | 8/1994 | Gould | 15/1.7 |

FOREIGN PATENT DOCUMENTS

| 0205697 | 12/1986 | European Pat. Off. | 15/1.7 |
|---|---|---|---|
| 2604351 | 4/1988 | France | 15/1.7 |
| 90/0467 | 10/1990 | South Africa . | |

Primary Examiner—David Scherbel
Assistant Examiner—Randall Chin
Attorney, Agent, or Firm—Dean W. Russell; Kilpatrick & Cody

[57] ABSTRACT

A swimming pool cleaner comprising an operating head providing two inlet openings and passages therethrough connecting to a single outlet is disclosed. The cleaner includes a valve to close intermittently in one passage and, optionally, a restriction valve in the other passage operable between greater and lesser degrees of restriction to enhance the smooth, consistent, and continual collection of dirt and debris from the pool surface.

13 Claims, 1 Drawing Sheet

SWIMING POOL CLEANER

FIELD OF INVENTION

This invention relates to swimming pool cleaners of the kind including an automatically repeatedly opening valve in a flow passage through the cleaner to induce movement thereof.

BACKGROUND OF THE INVENTION

Swimming pool cleaners using valves of different kinds to substantially intermittently cut off flow through the pool cleaner are now well known and widely used. The cut off or substantial interruption of flow induces forces which cause the pool cleaners to move in stepwise manner across the surface being cleaned. All the flow through the cleaner passes through this cut off valve, an example of which is described in my U.S. Pat. No. 4,769,867 (which patent is incorporated herein in its entirety by this reference).

The interruption of flow can have a deleterious effect on the pump assembly causing the flow through the cleaner and can result in pump starvation.

It has now been found that a fairly constant outlet flow from the pool cleaner to the pump assembly can be maintained while the pool cleaner nevertheless operates satisfactorily to clean submerged surfaces.

SUMMARY OF THE INVENTION

According to this invention there is provided a swimming pool cleaner comprising an operating head providing two inlet openings and passages therethrough connecting to a single outlet, with a valve to close intermittently in one passage and, optionally, a restriction valve in the other passage operable between greater and lesser degrees of restriction.

The pool cleaner will also be provided with a foot carrying an outwardly extending flexible disc and providing separate openings into the two passages through the head.

It is therefore an object of the present invention to provide a swimming pool cleaner having both an intermittently-closing valve and a restriction valve.

It is an additional object of the present invention to provide a swimming pool cleaner having two passages connecting to a single outlet, with the intermittently-closing valve disposed in one passage and the restriction valve disposed in the other.

Other objects, features, and advantages of the present invention will become apparent with reference to the remainder of the written portion and the drawings of this application.

BRIEF DESCRIPTION OF THE DRAWINGS

An example of this invention will be described with reference to the accompanying diagrammatic drawing (FIG. 1) which shows the operating mechanism in cross section.

DETAILED DESCRIPTION

Figure 1:
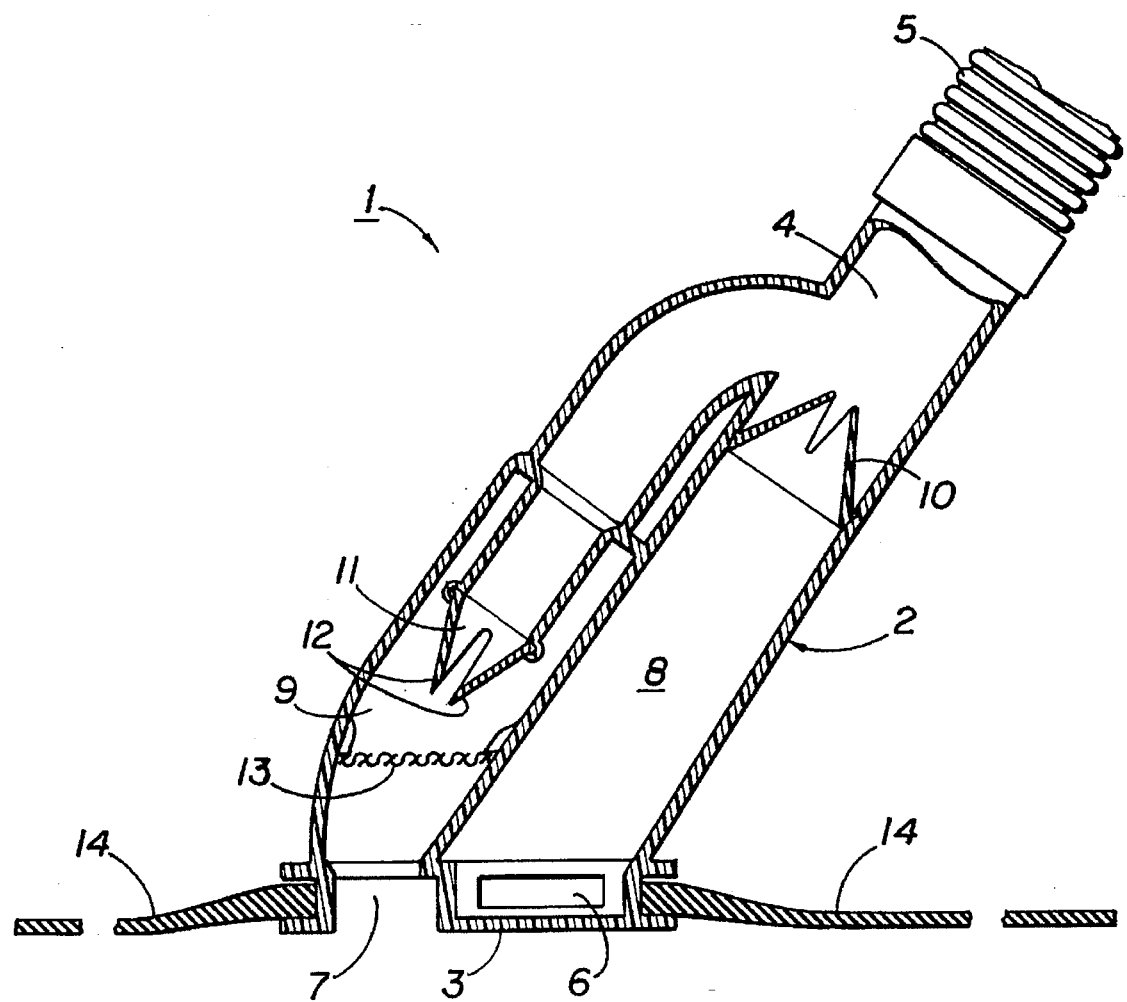

As illustrated in FIG. 1 the pool cleaner indicated generally at (1) has an operating head (2). The head (2) has a foot (3) adapted to engage the surface to be cleaned at one end and a single outlet (4) at the other for connection through a swivel (not shown) to a flexible corrugated suction hose (5).

The pool cleaner is provided with two separate inlet openings (6) and (7) into the head, each opening communicating through a separate passage (8 and 9) to the outlet (4).

The passage (8) which provides a main flow passage through the head has an automatically operating restriction valve (10) therein which operates between conditions of lesser and greater restrictions but at all times permits flow through the passage (8). It has been found that a valve made of suitable resilient material to a rounded or conical form with slots cut from the apex through the material operates very effectively. Preferably two slots intermeeting at right angles are used to form the valve. The characteristics of the material will determine the degree of restriction provided when the valve is in use and this can be determined by those skilled in the art. Reference in this regard can be made to South African Patent No. 90/0467, for example, which patent is incorporated herein in its entirety by this reference.

In the other passage (9) is located a valve (11) which operates on flow therethrough to automatically cut off or substantially interrupt the flow of water through the passage. Again any suitable valve can be used such as a tubular resilient diaphragm or a ball valve or, as diagrammatically illustrated in FIG. 1, a valve in the form of a pair of hinged jaws (12). Such valves are described in South African Patent No. 90/0467. The valve must be biased to a limited degree to the open position.

In use it has been found that, with the outlet connected in the usual manner for this kind of cleaner to the inlet of a filtration plant pump, flow from the outlet remains fairly constant. However flow through the passages (8) and (9) fluctuates due to the automatic operation of the valves (10) and (11) caused by the flow of water induced through them.

This fluctuation has been found to result in forces acting on the pool cleaner to cause it to move in the well known random fashion over the surface to be cleaned and the continual flow through the passage (8) results in a smooth and consistent and continual collection of dirt and debris from the surface. Other pool cleaners which rely on an interruption in the flow through the cleaner head tend to cause the dirt to be pushed away from the head with each stepwise movement of the cleaner.

A sieve (13) may be provided in passage (9) before the inlet to valve (11) to ensure that the valve does not become blocked.

The usual balancing mechanism will be attached to the operating head and a flexible disc (14) is rotatably mounted to extend outwardly from the remainder of the pool cleaner.

The pool cleaner (1) according to this invention operates smoothly and effectively without placing undue stress on the pump assembly. In some embodiments of pool cleaner (1), restriction valve (10) may be omitted so that fluid may flow through passage (8) without restriction. This is particularly appropriate when valve (11) permits only a low flow volume.

Figures 2, 3:
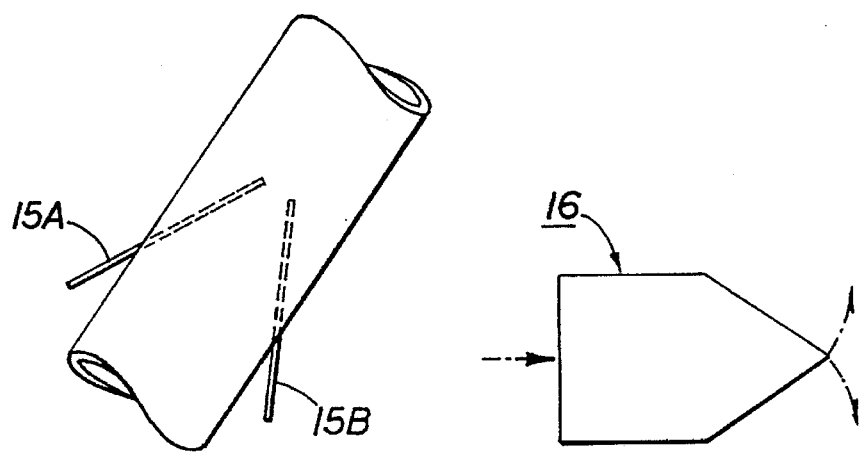
FIGS. 2 and 3 illustrate alternative restriction valves or mechanisms.

Alternatively, a spring-biased flap may be substituted for restriction valve (10). As shown in FIG. 2, vanes (15A and 15B) may also be used to restrict the flow of fluid through passage (8). In one embodiment vanes (15A and 15B) are made of metal, are generally flexible, and project into passage (8). Vanes (15A and 15B) can be repositioned, by sliding, so that desired amount of their lengths are disposed within passage (8), thereby changing the amount of flow through the passage (8).

FIG. 3 illustrates yet another suitable valve (16) for use as restriction valve (10). Valve (16) is generally similar to valves described in my U.S. Pat. No. 4,769,867, although biased toward the closed position. Other modifications to pool cleaner (1), including to restriction valve (10), will be apparent to those skilled in the art and may be made within the scope of the present invention.

I claim:

1. A swimming pool cleaner having an operating head comprising:
   a. first and second inlets;
   b. an outlet
   c. a primary passage connecting the first inlet to the outlet;
   d. a secondary passage connecting the second inlet to the outlet; and
   e. means, comprising a pair of hinged jaws, biased so as to be normally at least partially open and disposed within the secondary passage, for intermittently at least substantially interrupting the fluid flow through the secondary passage.

2. A cleaner according to claim 1 further comprising a sieve disposed within the secondary passage between the second inlet and the pair of hinged jaws.

3. A cleaner according to claim 1 further comprising means, disposed within the primary passage, for restricting but not precluding fluid flow through the primary passage.

4. A cleaner according to claim 3 in which the means for restricting but not precluding fluid flow comprises at least one vane whose position within the primary passage may be altered.

5. A cleaner according to claim 4 in which the means for restricting but not precluding fluid flow comprises a second vane whose position within the primary passage may be altered.

6. A cleaner according to claim 5 in which the means for restricting but not precluding fluid flow comprises a normally substantially closed valve.

7. A cleaner according to claim 3 in which the means for restricting but not precluding fluid flow comprises a spring-biased flap.

8. An automatic swimming pool cleaner comprising:
   a. first and second inlets;
   b. an outlet;
   c. a primary passage connecting the first inlet to the outlet;
   d. a secondary passage connecting the second inlet to the outlet;
   e. means, comprising a first valve disposed within the primary passage, for restricting but not precluding fluid flow through the primary passage; and
   f. means, comprising a second valve disposed within the secondary passage, for intermittently at least substantially interrupting the fluid flow through the secondary passage.

9. A cleaner according to claim 8 in which the first valve comprises a slotted, generally conical valve.

10. A cleaner according to claim 9 further comprising a sieve disposed within the secondary passage between the second inlet and the second valve.

11. A cleaner according to claim 10 in which the second valve comprises a pair of hinged jaws.

12. An automatic swimming pool cleaner comprising:
   a. first and second inlets;
   b. an outlet;
   c. a primary passage connecting the first inlet to the outlet;
   d. a secondary passage connecting the second inlet to the outlet;
   e. means, comprising a spring-biased flap disposed within the primary passage, for restricting but not precluding fluid flow through the primary passage; and
   f. means, comprising a valve disposed within the secondary passage, for intermittently at least substantially interrupting the fluid flow through the secondary passage.

13. An automatic swimming pool cleaner comprising:
   a. first and second inlets;
   b. an outlet;
   c. a primary passage connecting the first inlet to the outlet;
   d. a secondary passage connecting the second inlet to the outlet;
   e. means, comprising at least one vane disposed within the primary passage and whose position within the primary passage may be altered, for restricting but not precluding fluid flow through the primary passage; and
   f. means, comprising a valve disposed within the secondary passage, for intermittently at least substantially interrupting the fluid flow through the secondary passage.

* * * * *

UNITED STATES PATENT AND TRADEMARK OFFICE
CERTIFICATE OF CORRECTION

PATENT NO. :     5,634,229
DATED      :
INVENTOR(S) :    June 3, 1997

Herman Stoltz

It is certified that error appears in the above-indentified patent and that said Letters Patent is hereby corrected as shown below:

Column 3, line 29, delete "claim 5" and insert --claim 3--

Signed and Sealed this

Twenty-seventh Day of October, 1998

*Attest:*

BRUCE LEHMAN

*Attesting Officer*              *Commissioner of Patents and Trademarks*